Patented Apr. 27, 1943

2,317,670

UNITED STATES PATENT OFFICE 2,317,670

BACTERICIDE AND PROCESS OF MAKING THE SAME

Oakley Ormer Cook and Claud E. Watson, Dallas, Tex., assignors of one-tenth to Albert L. Reed and Carl B. Callaway, Dallas, Tex.

No Drawing. Application January 8, 1940, Serial No. 312,980

6 Claims. (Cl. 260—387)

This invention relates to a novel chemical compound and, more particularly, to an organic derivative prepared from certain aniline dyes.

The invention broadly stated includes a new organic compound not previously known, together with the method of preparing the same. The product resulting from this possesses remarkable bactericidal, protozoacidal, ovacidal and fungicidal action, while remaining relatively harmless to body tissues.

Fundamentally, the invention pertains to a new substance or article of manufacture prepared by the chemical interaction of a copper salt and a dye selected from the group including triphenyl-rosaniline, triphenyl-para-rosaniline and hexamethyl-para-rosaniline. More specifically, the new bactericide is prepared by the chemical combination of crystal violet and gentian violet and a dilute lactic acid solution containing cupric acetate.

In further explanation of the initial materials, it will be understood by those skilled in the art that crystal violet and gentian violet are dyes selected from the triphenyl-methane series, and as one specific example of a typical method of carrying out the invention to produce the new composition of matter, attention is directed to the following description:

Starting with crystal violet which is a pararosaniline derivative or, more particularly, a mixture of the hydrochlorides of pentamethyl-para-rosaniline and hexamethyl-para-rosaniline, a solution is prepared of approximately 1.5 grams of the compound dissolved in approximately 10.526 c. c. of alcohol (U. S. P.) and approximately 90 c. c. of water.

A solution of cupric acetate is then prepared which is composed of approximately 0.4 to 0.5 gram of the acetate dissolved in approximately 90 c. c. of water to which is added approximately 1.136 to 2 c. c. of lactic acid (85%) (U. S. P.) with sufficient water to make up 100 c. c. of solution. Thereafter approximately 8 c. c. of the copper salt solution are mixed with approximately 90 c. c. of the dye solution and the mixture is diluted to make up a unit of 100 c. c.

After allowing the mixture to stand for approximately 24 hours, it is passed under vacuum through a Berkfeld filter into a closed container. The solution is then in condition for immediate use or it may be stored and dispensed in serum bottles or ampules. It will be understood that, if desired, the solution may be evaporated under proper conditions to form a dry crystalline powder.

As before stated, gentian violet which is the hydrochloride of triphenyl-rosaniline and triphenyl-para-rosaniline may be used in place of the crystal violet.

Chemically, the novel compound produced by the above process is hexamethyl-para-rosaniline-chloride-copper. This substance has been found to be of low toxicity to body tissues and possesses a high quality of stimulating the reticulo-endothelial system, the principal defense agent of the body against disease. Among other therapeutic effects this new substance possesses a high penetrating effect on colloids, such as cell protoplasm, egg albumin, micro-organisms and the wax, such as produced by and surrounding tubercule bacilli.

Other valuable effects of this product on living tissue is its anesthetic reaction on nerve tissues and its use as a sclerosing agent in injection treatments. The compound possesses use in killing fungi found in various fungus infections of the body and in the purification of water, while its stability and solubility maintenance render it valuable in intravenous injections.

What we claim as new and desire to secure by Letters Patent of the United States is:

1. A non-toxic, stable therapeutic product, a dye of the rosaniline series chemically combined with cupric acetate and lactic acid.

2. As a new product, hexamethyl-para-rosaniline combined with a copper acetate stabilized by lactic acid and ethyl alcohol.

3. The method of preparing a therapeutic substance as described, which includes reacting a solution of hexamethyl-para-rosaniline with a solution of cupric acetate containing lactic acid.

4. The method of preparing a substance as described, which includes dissolving crystal violet in an alcohol-water solution, forming a separate aqueous solution of cupric acetate dissolved in lactic acid, and thereafter combining comparatively large portions of the first solution with comparatively small quantities of the second solution.

5. The process of preparing a chemical substance as described, which includes dissolving approximately 1.5 grams of crystal violet dye in approximately 10.5 c. c. of alcohol and approximately 90 c. c. of water; preparing a second solution of approximately 0.5 grams of cupric acetate dissolved in approximately 90 c. c. of water having approximately 2 c. c. of 85% U. S. P. lactic acid therein; and thereafter mixing approximately 90 c. c. of the first mentioned solution with approximately 8 c. c. of the second mentioned solution and approximately 2 c. c. of water.

6. A stabilized composition of matter comprising the product formed by reacting a dilute solution of copper acetate dissolved in a mixture of water and alcohol with a dilute solution of a rosaniline dye dissolved in a mixture of water and lactic acid.

OAKLEY ORMER COOK.
CLAUD E. WATSON.